United States Patent

[11] 3,622,734

[72] Inventor Albert Bruce Mainwaring
 Phoenixville, Pa.
[21] Appl. No. 29,877
[22] Filed Apr. 20, 1970
[45] Patented Nov. 23, 1971
[73] Assignee Uniform Tubes, Inc.
 Collegeville, Pa.

[54] NONTREPANNING ROTARY ELECTRODE FOR ELECTROEROSION OF METALS
 5 Claims, 8 Drawing Figs.
[52] U.S. Cl. .................................................. 219/69 E, 219/145
[51] Int. Cl. .................................................. B23k 9/16
[50] Field of Search ...................................... 219/69 E, 69 V, 145, 146

[56] References Cited
UNITED STATES PATENTS

| | | | |
|---|---|---|---|
| 2,385,665 | 9/1945 | Warwick ...................... | 219/69 V |
| 2,785,285 | 3/1957 | Bernard ........................ | 219/146 |
| 2,818,490 | 12/1957 | Dixon et al. ................. | 219/69 E |
| 3,058,895 | 10/1962 | Williams ....................... | 219/69 E |

Primary Examiner—Ralph F. Staubly
Assistant Examiner—G. R. Peterson
Attorney—McClure & Millman ABSTRACT: A rotary electrode for electroerosion of metals to form blind or deep through holes in which the dielectric fluid bore or conduit, at least at the operative end of the electrode, is of crescent shape in cross section having cusps extending beyond the central axis of the electrode to prevent the formation of a central plug or core due to trepanning as the electrode is rotated during the electroerosion operation, the bore at its widest cross-sectional area extending up to the central axis of the electrode as a maximum.

PATENTED NOV 23 1971   3,622,734

INVENTOR.
ALBERT BRUCE MAINWARING

BY
McClure, Weaver & Millman
ATTORNEYS.

3,622,734

NONTREPANNING ROTARY ELECTRODE FOR ELECTROEROSION OF METALS

This invention relates to the electroerosion of metals and more particularly to a rotary electrode for use with conventional electroerosion apparatus.

Electroerosion of metal workpieces to form blind or through holes therein is accomplished by applying a series of time-spaced spark discharges between a tubular rotary electrode and a workpiece. A dielectric fluid passes through the axial bore of the electrode to cool the electrode, whose tip or active end is consumed during the erosion process, and to flush out the debris or eroded metal in the annular space formed between the outer diameter of the electrode and the diameter of the hole being formed in the workpiece. The electrode is rotated and fed toward the workpiece as the erosion progresses.

The use of a dielectric fluid passage or bore which is coaxial with the electrode causes the formation by trepanning of a central plug or core in the hole forming in the workpiece which approximates the diameter of the electrode bore. This renders the electroerosion process inefficient since the plug or core must be subsequently removed, if a blind hole is made, by mechanical means which are not only time consuming but often difficult to accomplish. In the case of the formation of deep through holes, trepanning inhibits continued electroerosion.

The prior art has recognized this trepanning problem and has suggested solving the same by the use of an eccentric bore. See Dixon et al. U.S. Pat. No. 2,818,490 and Adcock U.S. Pat. No. 2,902,585. An eccentric bore is one which is offset from the longitudinal axis of the electrode so that its cross-sectional area is located between the central axis of the electrode and a wall of the electrode as shown in FIGS. 4–7 of Dixon et al. Such an eccentric bore necessarily thins the wall of the electrode and is difficult to manufacture by conventional tube-drawing equipment.

It is the primary object of this invention to provide a rotary electrode with an eccentric bore to prevent the formation of a plug by trepanning of such shape that the electrode wall is not thinned and the same can be efficiently manufactured with existing conventional tube-drawing equipment.

Another object of the invention is to provide a rotary electrode with a crescent-shaped bore having cusps which extend beyond the central axis of the electrode to provide an efficient eccentrically acting bore embodied in a strong and sturdy electrode.

A further object of the invention is to provide a rotary electrode with a crescent-shaped bore therein formed by indenting a predetermined outer longitudinal area of a conventional tubular electrode until the crest of the inner surface of the indented portion meets or extends beyond the central axis of the electrode.

These and other objects of the invention will become more apparent as the following description proceeds in conjunction with the accompanying drawings, wherein.

Figure 2:
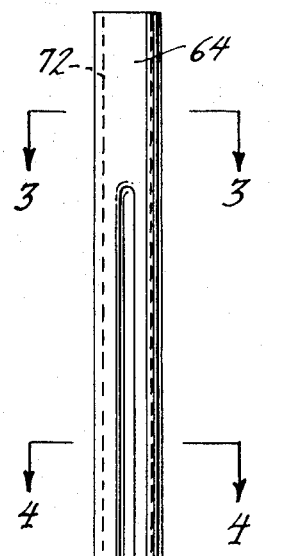
FIG. 2 is a side elevational view of the electrode per se.
Figure 5:
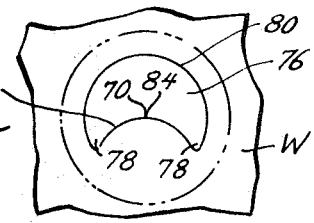
Figure 4:
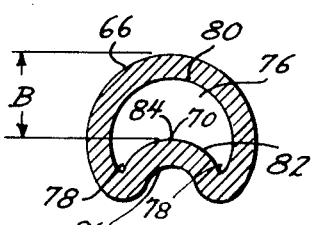
Figure 8:
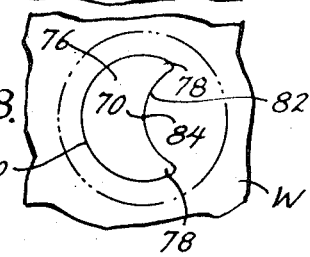

FIG. 4 is a sectional view taken on the line 4—4 of FIG. 2 and illustrating the active portion of the electrode; and FIGS. 5–8 are diagrammatic views illustrating the relative position of the crescent-shaped base of the electrode during rotation at the 12, 3, 6, and 9 o'clock positions.

Specific reference is now made to the drawings in which similar reference characters are used for corresponding elements throughout.

Figure 1:
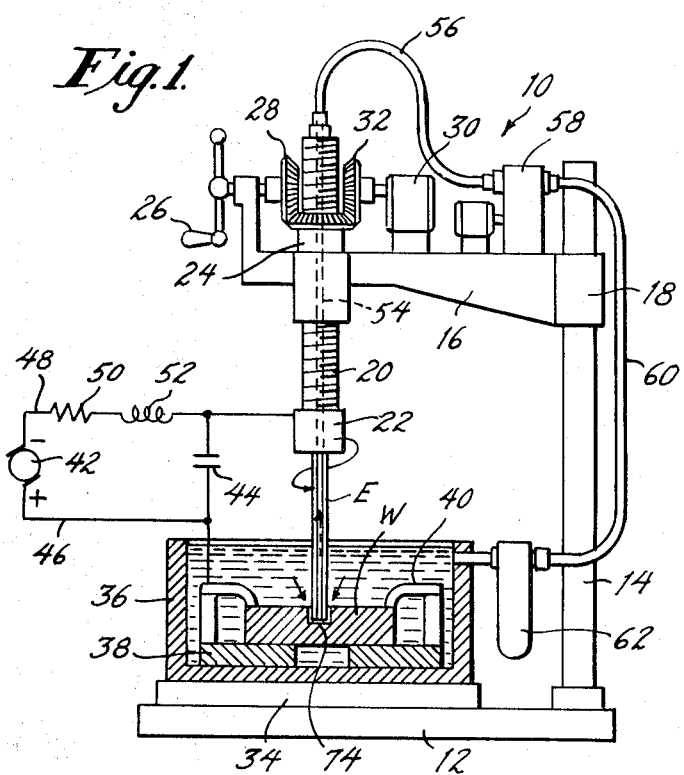
FIG. 1 is an elevational view, partly in section and partly diagrammatic, of a conventional rotary electroerosion apparatus employing the electrode of the instant invention.

Referring first to FIG. 1 and the conventional electroerosion apparatus 10 shown therein, the same comprises a mechanical and an electrical unit.

The mechanical unit comprises a base 12 upon which an upright post 14 is mounted which carries a lateral arm 16 which is vertically adjustable by means of a clamp 18. The arm 16 carries a threaded spindle 20 whose lower end is equipped with a chuck 22 for removably retaining the upper shank or inoperative end of the electrode E of the instant invention.

The feeding of the spindle 20 can be effected by manual or automatic rotation of an internally threaded pinion 24 which abuts the arm 16 and receives the threaded spindle 20. Manual feeding can be effected by means of a handcrank 26 which drives a pinion 28 that meshes with pinion 24. Automatic feeding can be effected by means of a motor and reduction gear unit 30 which drives a pinion 32 that meshes with the pinion 24.

Mounted on the base 12 over an insulating pad 34 is a dielectric fluid container 36 which is equipped with a mounting block 38 having dogs 40 which secure the workpiece W.

A variety of electrical circuits may be utilized to supply spark discharges between the operative end of the electrode E and the workpiece W. For illustrative purposes the circuit shown in FIG. 1 comprises a direct current source 42 and a condenser 44 which is charged from the source via conductors 46 and 48 which include a resistor 50 and an inductance 52. The conductor 48 from the negative side of the source is conducted to the chuck 22 while the conductor 46 from the positive side is connected to workpiece holder 40.

To circulate dielectric fluid through the bore of the electrode to cool the same and remove dislodged particles from the workpiece, the spindle 20 is provided with a bore 54 which communicates with the electrode bore and which is connected via a conduit 56 with the suction side of a pump 58, the delivery side of the pump being connected via a flexible conduit 60 and a filter unit 62 to the container 36.

The electrode E is an elongated tubular member made of a variety of materials such as brass, copper, copper alloys and the like. At the upper or shank end 64, which is mounted in the chuck 22, the outer surface 66 of the wall of the electrode is circular in cross section and the bore 68 thereof is also of circular cross section and is coaxial with the central axis 70 of the electrode, thus providing an inner surface 72 of circular cross section. This upper or shank portion of the electrode is relatively short and extends for a length sufficient to permit it to be removably retained in the chuck 22.

Figure 3:
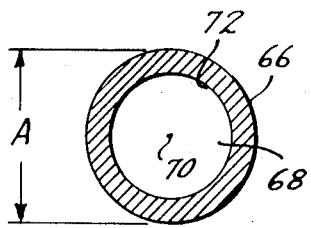
FIG. 3 is a sectional view taken on the line 3—3 of FIG. 2 and illustrating the inactive portion of the electrode for mounting in the chuck of the apparatus.
Figure 6:
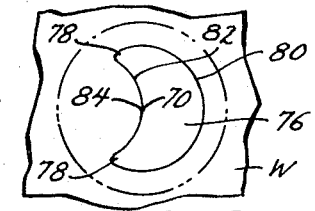
Figure 7:
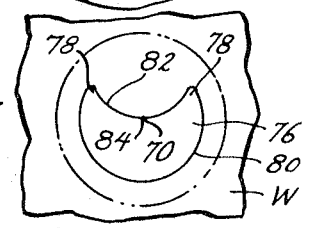

For the remaining length of the electrode down to its active or operative tip 74, the bore 76 which is continuous with the shank bore 68, is crescent-shaped in cross section and symmetrical relative to the central axis 70 of the electrode thereby providing cusp portions 78 which extend beyond the central axis 70 on both sides thereof into the area of the electrode diametrically opposite that in which the main or noncusp portion of the bore is located. Thus it will be seen that the crescent-shaped bore provides an inner wall, the outer portion 80 of which is larger and generally circumferentially extending while the inner portion 82 is shorter, reversely curved and also circumferentially extending, thus forming the cusps 78. Preferably the centering point or node 84 of the reversely curved portion 82 is substantially coincident with the central axis 70 of the electrode. However, to prevent any formation of a central plug or core by trepanning, the radial distance B from the outer wall surface 66 to the node 84, as seen in FIG. 4, must be equal to or less than ½A, see FIG. 3, which is the outer diameter of the electrode.

While the crescent-shaped bore 76 may be formed in the electrode in such a manner that its outer wall 66 remains circular in cross section, it is preferred that it be formed as shown in FIGS. 2 and 4. Thus the electrode is provided for its entire length with a central bore which is coaxial with its central axis, as bore 68 in the shank portion 64. Then by drawing the tubular electrode through a shaped die a longitudinal indentation or crease 86 is formed in the wall, the centering joint or node 84 of the inner surface of the wall substantially coinciding with the central axis 70 of the electrode, the indentation or crease 86 extending from the tip 74 to the shank portion 64. Thus the bore 76 is formed into a crescent shape with its cusps 78 extending beyond the central axis of the electrode.

In operation to provide a blind hole or a deep through hole (since trepanning in such a through hole inhibits the continued electroerosion thereof) the electrode is infed toward the workpiece so as to maintain a particular spark gap and simultaneously rotated. In so doing, the spark erodes a hole in the workpiece and the tip 74 of the electrode is consumed, while the dielectric fluid acts to cool the same and flush out the dislodged portions of the workpiece in the annular space between the rotating electrode and the blind hole forming in the workpiece. As will be seen in FIGS. 5-8, as the electrode rotates the position of the crescent-shaped bore 76 with its cusps 78 is such that the surface 82 at the node 84 always traverses or eclipses the central portion of the workpiece, thus preventing formation of a central plug or core due to trepanning in said central portion of the workpiece.

It will be understood that while a cylindrical tubular electrode has been shown and described herein, the crescent-shaped bore can be embodied in an electrode of other cross sections, such as square, rectangular, etc. When an electrode having a noncircular cross section is rotated, its high point or points will, or course, generate a circle whose diameter will be the same as that designated A herein, in which case the distance B will be equal to or less than one-half the diameter of the generated circle.

While a preferred embodiment of the invention has been shown and described, it is understood that a skilled artisan may make minor variations without departing from the spirit of the invention.

I claim:

1. A rotary electrode for forming holes in metal workpieces by electroerosion, the improvement in the electrode comprising an elongated metallic member having a through bore for the passage of a dielectric fluid, said bore at the active end of the member being crescent-shaped in cross section and having cusps extending beyond the central axis of the member, said crescent-shaped bore including a longer outer circumferentially extending curved surface and a shorter inner reversely curved circumferentially extending surface having a node, the radial distance from the outer surface of the member centrally through the bore to the node being equal to or less than one-half the diameter of the circle generated by the outer surface of the member during its rotation.

2. The electrode of claim 1 wherein the member is cylindrical and the node of the reversely curved surface of the crescent-shaped bore is coincident with the central axis of the member.

3. The electrode of claim 1 wherein the crescent-shaped bore extends for the length of the member from the active end thereof.

4. A rotary electrode for forming holes in metal workpieces by electroerosion, the improvement in said electrode comprising an elongated cylindrical metallic member having a through bore for the passage of a dielectric fluid, said bore at the active end of the member being crescent-shaped in cross section, said crescent-shaped bore being formed of a longer outer circumferentially extending curved surface and a shorter inner reversely curved, circumferentially extending surface having a node, the radial distance from the outer surface of the member centrally through the bore to the node being equal to or less than one-half the outer diameter of the member, the wall of the member being radially indented along the length of the crescent-shaped bore to thereby form the shorter inner reversely curved surface thereof.

5. The electrode of claim 4 wherein the crescent-shaped bore extends for the length of the member.

* * * * *